United States Patent
Byun et al.

(10) Patent No.: US 10,850,989 B2
(45) Date of Patent: Dec. 1, 2020

(54) METHOD FOR PREPARING SOLID LITHIUM SALT FROM LITHIUM SOLUTION

(71) Applicant: SUNGEEL HITECH CO., LTD., Jeollabuk-do (KR)

(72) Inventors: Suk-Hyun Byun, Jeollabuk-do (KR); Kang-Myung Yi, Seoul (KR); Ki-Woong Lee, Gyeonggi-do (KR); Kwang-Joong Kim, Jeollabuk-do (KR); Woo-Young Jung, Jeollabuk-do (KR)

(73) Assignee: SUNGEEL HITECH CO., LTD., Jeollabuk-do (KR)

( * ) Notice: Subject to any disclaimer, the term of this patent is extended or adjusted under 35 U.S.C. 154(b) by 466 days.

(21) Appl. No.: 15/692,246

(22) Filed: Aug. 31, 2017

(65) Prior Publication Data

US 2018/0170763 A1 Jun. 21, 2018

(30) Foreign Application Priority Data

Dec. 20, 2016 (KR) ........................ 10-2016-0174795
Mar. 7, 2017 (KR) ........................ 10-2017-0028708

(51) Int. Cl.
   *C01D 15/00* (2006.01)
   *C01D 15/08* (2006.01)
   (Continued)

(52) U.S. Cl.
   CPC ............ *C01D 15/08* (2013.01); *C01B 25/301* (2013.01); *C01D 15/06* (2013.01); *C22B 26/12* (2013.01);
   (Continued)

(58) Field of Classification Search
   CPC .. H01M 10/54; H01M 10/4242; C01D 15/08; C01B 25/301
   (Continued)

(56) References Cited

U.S. PATENT DOCUMENTS

| 2,608,465 A | 8/1952 | May |
| 2014/0227153 A1* | 8/2014 | Laucournet ............. C22B 7/006 423/141 |

(Continued)

FOREIGN PATENT DOCUMENTS

| JP | 2011168461 A | 9/2011 |
| JP | 2011168858 A | 9/2011 |

(Continued)

OTHER PUBLICATIONS

Non-Final Rejection, U.S. Appl. No. 15/692,266, filed Aug. 31, 2017, dated Jun. 12, 2019.

(Continued)

*Primary Examiner* — Steven J Bos
(74) *Attorney, Agent, or Firm* — George S. Blasiak, Esq.; Heslin Rothenberg Farley & Mesiti P.C.

(57) ABSTRACT

An embodiment of the present invention provides a method for preparing a solid lithium salt from a lithium solution including the steps of, preparing a mixture in which a phosphorus-containing material is added to a lithium solution in step 1; adding a basic solution to the prepared mixture to adjust the pH in step 2; making the pH-adjusted mixture react by raising its temperature and filtering to recover lithium phosphate in step 3; preparing an acid lithium solution in which distilled water and acid are added to the recovered lithium phosphate, in step 4; and recovering a solid lithium salt by evaporative concentration of the acid lithium solution, in step 5.

23 Claims, 9 Drawing Sheets

(51) Int. Cl.
  *H01M 10/42* (2006.01)
  *C01B 25/30* (2006.01)
  *C22B 26/12* (2006.01)
  *C01D 15/06* (2006.01)
  *H01M 10/54* (2006.01)

(52) U.S. Cl.
  CPC ..... *H01M 10/4242* (2013.01); *C01P 2002/72* (2013.01); *C01P 2006/80* (2013.01); *H01M 10/54* (2013.01)

(58) Field of Classification Search
  USPC .......................................... 423/179.5; 429/49
  See application file for complete search history.

(56) References Cited

U.S. PATENT DOCUMENTS

| 2015/0013499 | A1  | 1/2015 | Asano |          |
|--------------|-----|--------|-------|----------|
| 2015/0071837 | A1* | 3/2015 | Chon  | B01J 19/18 |
|              |     |        |       | 423/179.5 |
| 2015/0259215 | A1* | 9/2015 | Harrison | C01D 15/08 |
|              |     |        |       | 423/179.5 |
| 2017/0084965 | A1  | 3/2017 | Song  |          |
| 2018/0166753 | A1  | 6/2018 | Byun  |          |

FOREIGN PATENT DOCUMENTS

| JP | 2016528140 A     | 9/2016  |
|----|------------------|---------|
| KR | 20120063424 A    | 6/2012  |
| KR | 20140126943 A    | 11/2014 |
| KR | 20150002963 A    | 1/2015  |
| KR | 10-2016-0002579 A | 1/2016 |
| KR | 101604954 B1     | 3/2016  |
| WO | WO 2016130790 A1 | 8/2016  |

OTHER PUBLICATIONS

Response to Non-Final Rejection, U.S. Appl. No. 15/692,266, filed Aug. 31, 2017, dated Sep. 12, 2019.
Korean Notice of Allowance, Korean Publication No. 1020170250479, dated Aug. 10, 2017 (Cited with the Original document and a Full Text Translation).

* cited by examiner

FIG. 9

\* Each value shows relative weight value based on 1000 part by weight of a lithium waste solution

| Classification | Li wastewater | Lithium phosphate | Lithium phosphate sulfuric acid decomposition solution | Lithium sulfate | Wash solution | Lithium sulfate solution | Residue (lithium phosphate) | Lithium carbonate | Lithium carbonate recover filtrate | Recovery rate |
|---|---|---|---|---|---|---|---|---|---|---|
| First cycle | 1,000 | 15.68 | 90.16 | 23.52 | 5.88 | 82.32 | 0.13 | 12.21 | 176.39 | 76.52% |
| Li wastewater 1,000 | | | | | | | | | | |
| Second cycle | 1,176 | 18.44 | 111.02 | 27.84 | 6.96 | 97.45 | 0.16 | 14.46 | 208.83 | 90.60% |
| Li wastewater 1,000 | | | | | | | | | | |
| Third cycle | 1,209 | 18.95 | 115.00 | 28.64 | 7.16 | 100.24 | 0.16 | 14.87 | 214.79 | 93.18% |
| Li wastewater 1,000 | | | | | | | | | | |
| Fourth cycle | 1,215 | 19.05 | 115.73 | 28.79 | 7.20 | 100.75 | 0.16 | 14.95 | 215.89 | 93.66% |
| Li wastewater 1,000 | | | | | | | | | | |
| Fifth cycle | 1,216 | 19.06 | 115.86 | 28.81 | 7.20 | 100.84 | 0.16 | 14.96 | 216.09 | 93.75% |

METHOD FOR PREPARING SOLID LITHIUM SALT FROM LITHIUM SOLUTION

CROSS-REFERENCE TO RELATED APPLICATIONS

This application claims the priority of Korean Patent Application No. 10-2017-0028708 filed on Mar. 7, 2017 and all the benefits accruing therefrom under 35 U.S.C. § 119, the content of which is incorporated by reference in its entirety. This application also claims the priority of Korean Patent Application No. 10-2016-0174795 filed on Dec. 20, 2016 and all the benefits accruing therefrom under 35 U.S.C. § 119, the content of which is incorporated by reference in its entirety.

BACKGROUND OF THE INVENTION

Field of the Invention

The present invention relates to a method for preparing a solid lithium salt from a lithium solution and more particularly, to a method for forming a lithium solution into an intermediate product such as lithium phosphate and a lithium acid solution, and then finally producing a solid lithium salt.

Description of the Related Art

The process of recycling waste batteries is divided into a dry process and a wet process. The dry process for recycling waste batteries is a process in which waste lithium secondary batteries are put into a high-temperature furnace to recover valuable metals. The dry process is relatively simple, but there are downsides in that its initial investment costs are high, its recovery rate of valuable metals is low, and gas treatment costs are high.

The wet process for recycling waste batteries is a process of dissolving waste batteries in sulfuric acid and extracting valuable metals using solvents. The wet process is advantageous in that the initial cost is low, the recovery rate of the metal is high, and high-purity valuable metals can be produced. However, there is a downside of the wet process in that the treatment cost for the waste solution used for solvent extraction is high. Domestic waste batteries are estimated at 20,000 tons/year, and manganese sulfate waste solution and lithium waste solution are generated in large quantities through a solvent extraction process that recovers cobalt and nickel from waste batteries. Particularly, in the case of the lithium waste solution, not only is the amount of the generated lithium waste large but the concentration of contained lithium is also as high as about 3000 ppm, and so the development of a technology capable of recovering lithium is urgently required.

As a relevant technology, Korean Patent Laid-Open Publication No. 10-2015-0002963 discloses a method of recovering lithium from a lithium-containing waste solution using a solvent extraction method, wherein the lithium recovering method includes, an extraction process where lithium is extracted from the lithium-containing waste solution by mixing the lithium-containing waste solution with an extracting agent that is diluted with a diluent and then adjusting the equilibrium pH; and a snipping process of stripping the organic phase obtained by the extraction process by mixing snipping agent and condensing the lithium.

Presently, recycling of lithium is carried out only for alloys containing lithium metal. There have been many researches and developments of lithium recovery of waste secondary batteries, but currently there is no commercially available technology due to economic efficiency. In addition, in the case of lithium waste solution, not only is the amount of the generated lithium waste large but the concentration of contained lithium is also as high as about 3000 ppm, and so the development of a technology capable of recovering lithium is urgently required. Conventional lithium recovery processes using adsorption-desorption concentration-solvent extraction or evaporative concentration-solvent extraction technology have high process costs of 5,000,000 won/ton which makes it difficult to apply.

SUMMARY OF THE INVENTION

Accordingly, various aspects of the present invention are directed to providing a method for preparing a solid lithium salt by adding a phosphorus-containing material to a lithium solution to recover lithium phosphate, which is formed into an acid lithium solution and then evaporative concentration is performed to prepare solid lithium salt, thereby providing a method for preparing a solid lithium salt which is economical, environmentally friendly, high in lithium recovery rate and can be used for various purposes. In one embodiment, the lithium solution of step 1 may be a waste solution of a waste lithium battery.

According to an aspect of the present invention, there is provided a method for preparing a solid lithium salt from a lithium solution including the steps of, preparing a mixture in which a phosphorus-containing material is added to a lithium solution in step 1; adding a basic solution to the prepared mixture to adjust the pH in step 2; making the pH-adjusted mixture react by raising its temperature and filtering to recover lithium phosphate in step 3; preparing an acid lithium solution in which distilled water and acid are added to the recovered lithium phosphate, in step 4; and recovering a solid lithium salt by evaporative concentration of the acid lithium solution, in step 5.

In one embodiment, the phosphorus-containing material in step 1 may include phosphoric acid ($H_3PO_4$) or phosphate.

In one embodiment, the phosphorus-containing material addition ratio in step 1 may be 0.8 to 1.2 times the lithium equivalent in the lithium solution.

In one embodiment, the basic solution of step 2 is a basic solution including one or more selected from a group consisting of sodium hydroxide (NaOH), potassium hydroxide (KOH), magnesium hydroxide ($Mg(OH)_2$), calcium hydroxide ($Ca(OH)_2$), and barium hydroxide ($Ba(OH)_2$).

In one embodiment, the addition of the basic solution of step 2 may be performed such that the pH of the mixture is from 10 to 12.

In one embodiment, the temperature raise in step 3 may be performed so the temperature is raised to 70° C. to 90° C. and a reaction may be carried out by maintaining the temperature for 30 minutes to 90 minutes after the temperature is raised.

In one embodiment, the preparation of the acid lithium solution in step 4 may be performed by adding 15 to 4.5 times by weight of distilled water relative to the recovered lithium phosphate and 0.75 to 1.75 times by weight of acid relative to the recovered lithium phosphate.

In one embodiment, the acid in step 4 may include one or more selected from a group consisting of sulfuric acid, nitric acid, hydrochloric acid, acetic acid, oxalic acid, citric acid and formic acid.

In one embodiment, the evaporative concentration of step 5 may be performed one to five times.

In one embodiment, filtration may be performed after the evaporative concentration of step 5, and the filtrate resulting from the filtration may be used as the phosphorus-containing material of step 1.

In one embodiment, washing the lithium salt recovered in step 5, may be further included as step 5a.

In one embodiment, the washing of step 5a may be performed with 10 wt % to 40 wt % of distilled water relative to the recovered lithium salt.

In one embodiment, a wash solution resulting from the washing of step 5a may be used to prepare the acid lithium solution of step 4.

According to another aspect of the present invention, there is provided a method for preparing a solid lithium sulfate from a waste solution of a waste lithium battery, including the steps of, preparing a mixture in which phosphoric acid is added to a waste solution of a waste lithium battery containing lithium in step i; adding a basic solution to the prepared mixture to adjust the pH to 10 to 12 in step ii; raising the temperature of the pH-adjusted mixture to a temperature of 70° C. to 90° C. to make it react and recovering lithium phosphate by filtration in step iii; preparing a lithium sulfate solution in which distilled water and sulfuric acid are added to the recovered lithium phosphate, in step iv; and recovering a solid lithium sulfate by evaporative concentration of the lithium sulfate solution, in step v.

According to another aspect of the present invention, there is provided a method for preparing a solid lithium sulfate from a waste solution of a waste lithium battery, including the steps of, preparing a mixture in which phosphoric acid is added 0.8 to 1.2 times the lithium equivalent of a waste solution of a waste lithium battery containing lithium at a concentration of 1.5 g/L to 6.0 g/L, to the waste solution in step a; adding sodium hydroxide to the prepared mixture to adjust the pH to 10 to 12 in step b; raising the temperature of the pH-adjusted mixture to a temperature of 70° C. to 90° C. and make it react for 30 to 90 minutes and recovering lithium phosphate by filtration in step c; preparing a lithium sulfate solution in which distilled water is added 2.5 to 4.5 times the lithium phosphate by weight and sulfuric acid is added 0.75 to 1.75 times the lithium phosphate by weight to the recovered lithium phosphate, in step d; and recovering and washing a solid lithium sulfate by evaporative concentration and filtration of the lithium sulfate solution, wherein the evaporative concentration and filtration may be performed two to five times, in step e.

According to yet another aspect of the present invention, there is provided a method for preparing a solid lithium carbonate from a lithium solution, including the steps of, preparing a mixture in which a phosphorus-containing material is added to a lithium solution in step 1; adding a basic solution to the prepared mixture to adjust the pH in step 2; making the pH-adjusted mixture react by raising its temperature and filtering to recover lithium phosphate in step 3; preparing an acid lithium solution in which distilled water and acid are added to the recovered lithium phosphate, in step 4; recovering a solid lithium salt by evaporative concentration of the acid lithium solution, in step 5; adjusting the pH by adding distilled water and a basic solution to the recovered solid lithium salt, in step 6; and preparing a solid lithium carbonate by adding a carbonate to the pH-adjusted solution, in step 7.

In one embodiment, the amount of distilled water added in step 6 may be 2 to 20 times the weight of the recovered solid lithium salt.

In one embodiment, the basic solution of step 6 may include one or more selected from a group consisting of sodium hydroxide (NaOH), potassium hydroxide (KOH), magnesium hydroxide ($Mg(OH)_2$), calcium hydroxide ($Ca(OH)_2$), barium hydroxide ($Ba(OH)_2$), and a carbonate.

In one embodiment, the pH adjustment in step 6 may be adjusted to a pH of 9 to 11.

In one embodiment, the pH adjustment of step 6 may be performed at a temperature of 60° C. to 90° C. for 30 minutes to 90 minutes.

In one embodiment, in step 6, filtration may be performed after the pH adjustment, and the filtrate from the filtration may be used to prepare the acid lithium solution of step 4.

In one embodiment, the carbonate of step 7 may be one or more selected from a group consisting of sodium carbonate ($Na_2CO_3$), sodium bicarbonate ($NaHCO_3$), potassium carbonate ($K_2CO_3$), potassium bicarbonate ($KHCO_3$), calcium carbonate ($CaCO_3$), magnesium carbonate ($MgCO_3$), barium carbonate ($BaCO_3$) and dolomite ($CaMg(CO_3)_2$).

In one embodiment, in step 7, filtration may be performed after the addition of the carbonate, and the filtrate from the filtration may be used to prepare the mixture of step 1.

In one embodiment, in step 7, washing may be performed after the filtration, and the wash solution resulting from the washing may be used to prepare the mixture of step 1 above.

According to another aspect of the present invention, there is provided a method for preparing, a solid lithium carbonate from a waste solution of a waste lithium battery, including the steps of, preparing a mixture in which phosphoric acid is added to a waste solution of a waste lithium battery containing lithium in step i; adding a basic solution to the prepared mixture to adjust the pH to 10 to 12 in step ii;

raising the temperature of the pH-adjusted mixture to a temperature of 70° C. to 90° C. to make it react and recovering lithium phosphate by filtration in step iii;

preparing a lithium sulfate solution in which distilled water and sulfuric acid are added to the recovered lithium phosphate, in step iv;

recovering a solid lithium sulfate by evaporative concentration of the lithium sulfate solution, in step v;

adjusting the pH by adding distilled water and a basic solution to the recovered solid lithium sulfite, in step vi; and preparing a solid lithium carbonate by adding a carbonate to the pH-adjusted solution, in step vii.

According to another aspect of the present invention, there is provided a method for preparing a solid lithium carbonate from a waste solution of a waste lithium battery, including the steps of, preparing a mixture in which phosphoric acid is added 0.8 to 1.2 times the lithium equivalent of a waste solution of a waste lithium battery containing lithium at a concentration of 1.5 g/L to 6.0 g/L, to the waste solution in step a; adding sodium hydroxide to the prepared mixture to adjust the pH to 10 to 12 in step b; raising the temperature of the pH-adjusted mixture to a temperature of 70° C. to 90° C. and making it react for 30 to 90 minutes and recovering lithium phosphate by filtration in step c; preparing a lithium sulfate solution in which distilled water is added 2.5 to 4.5 times the lithium phosphate by weight and sulfuric acid is added 0.75 to 1.75 times the lithium phosphate by weight to the recovered lithium phosphate, in step d; recovering and washing a solid lithium sulfate by evaporative concentration and filtration of the lithium sulfate solution, wherein the evaporative concentration and filtration may be performed two to five times, in step e; adding distilled water in an amount 2 to 20 times the weight of the lithium sulfate to the recovered solid lithium sulfate and filtering after adding a sodium hydroxide solution to adjust the pH to 9 to 11, in step f; and adding a sodium carbonate solution at a concentration of 5 wt % to 50 wt % to the filtered filtrate and preparing a solid lithium carbonate by filtering and washing, in step g.

According to another aspect of the present invention, there is provided a solid lithium carbonate including 90 wt % to 95 wt % of lithium relative to the lithium content of the waste solution.

According to an aspect of the present invention, lithium that can be disposed of in a process can be minimized by the reuse of a filtrate, a washing solution, and the like. Further, 90 wt % to 95 wt % of lithium relative to the lithium in a lithium solution can be recovered.

It should be understood that the effects of the present invention are not limited to the above effects and include all effects that can be deduced from the detailed description of the present invention or the configuration of the invention described in the claims.

BRIEF DESCRIPTION OF THE DRAWINGS

FIG. 9 is a schematic diagram showing recovery rates by progress cycles when the lithium byproducts for each step are added to a previous step.

DETAILED DESCRIPTION OF THE INVENTION

Figure 1:
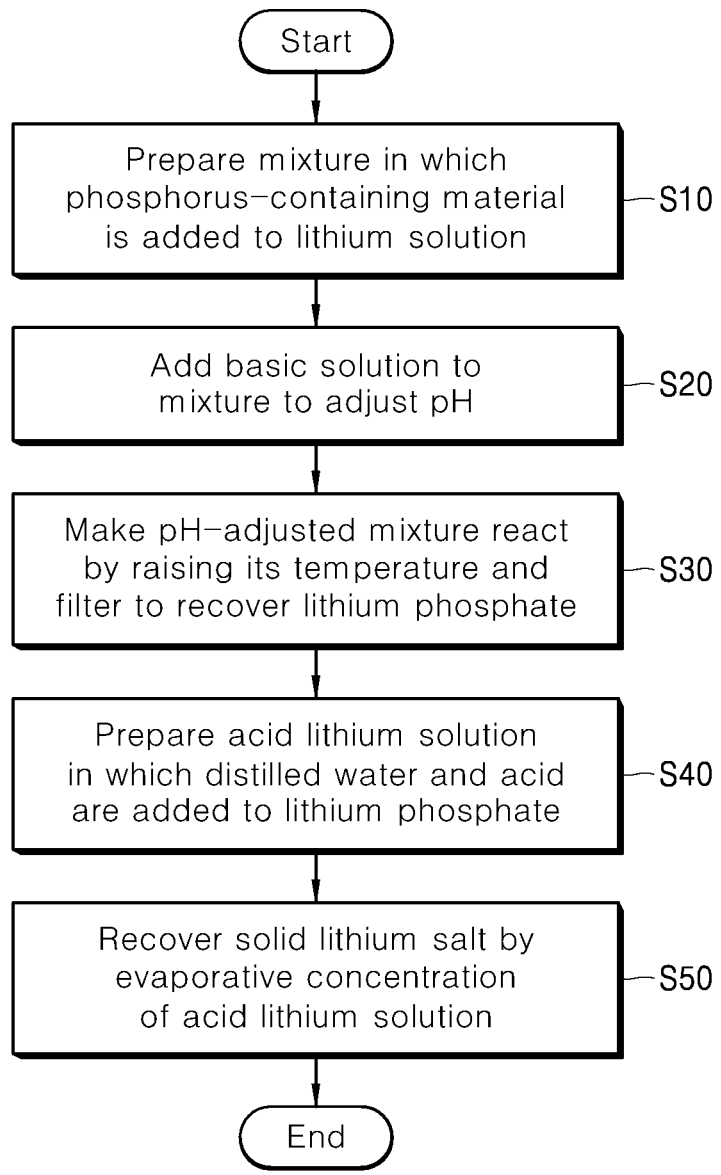
FIG. 1 is a schematic view showing an example of a method for preparing a solid lithium salt from a lithium solution according to an embodiment of the present invention.

Exemplary embodiments of the present disclosure will be described in detail below with reference to the accompanying drawings.

The advantages and/or features of the present invention and the manner of achieving them will become apparent by refuting to various embodiments described in detail below with reference to the accompanying drawings.

However, the present invention is not limited to the configurations of the embodiments described below, but may be embodied in various other forms, and each embodiment disclosed in this specification is intended to be illustrative only, and it will be understood by those of ordinary skill in the art that various changes in form and details may be made therein without departing from the spirit and scope of the invention as defined by the appended claims.

Also, in the following description of the present invention, a detailed description of a configuration that is considered to unnecessarily obscure the gist of the present invention, for example, a known technology including the prior art, may be omitted.

According to an aspect of the present invention, there is provided a method for preparing a solid lithium salt from a lithium solution including the steps of, preparing a mixture in which a phosphorus-containing material is added to a lithium solution in step 1 in S10;

adding a basic solution to the prepared mixture to adjust the step 2 in S20;

making the pH-adjusted mixture react by raising its temperature and filtering to recover lithium phosphate in step 3 in S30;

preparing an acid lithium solution in which distilled water and acid are added to the recovered lithium phosphate, in step 4 in S40, and recovering a solid lithium salt by evaporative concentration of the acid lithium solution, in step 5 in S50.

Hereinafter, a method for preparing a solid lithium salt from a lithium solution according to an aspect of the present invention will be described in detail fix each step.

In the method for preparing a solid lithium salt from a lithium solution according to an aspect of the present invention, a mixture in which a phosphorus-containing material is added to a lithium solution is prepared in step 1 in S10.

The lithium solution of step 1 may be a waste solution of a waste lithium battery.

The lithium concentration of the lithium solution of step 1 may be from 1.5 g/L to 6.0 g/L, and preferably from 1.5 g/L to 3.5 g/L. If the lithium concentration is less than 1.5 g/L, the lithium recovery rate may decrease in the filtration step described later. If the lithium concentration is more than 6.0 g/L, it may be economical to recover lithium salt by simple evaporative concentration.

The phosphorus-containing material of step 1 may include phosphoric acid ($H_3PO_4$) or phosphate, and the phosphate may be one or more selected from a group consisting of potassium phosphate, sodium phosphate, aluminum phosphate, zinc phosphate, ammonium polyphosphate and sodium hexametaphosphate and the like, and preferably a phosphorus-containing material containing phosphoric acid may be used.

The addition ratio of the phosphorus-containing material in step 1 may be 0.8 to 1.2 times, preferably 0.9 to 1.1 times, the lithium equivalent of the lithium solution. If the phosphorus-containing material is added in an equivalent amount less than 0.8 times the lithium of the lithium solution, the recovery rate of lithium may be lowered in the filtration step to be described later. If the phosphorus-containing material is added in an equivalent amount more than 1.2 times the lithium of the lithium solution, the use of excessive phosphorus-containing material can result in economic waste and increased wastewater treatment costs.

In a method for preparing a solid lithium salt from a lithium solution according to an aspect of the present invention, a basic solution is added to the prepared mixture to adjust the pH in step 2 in S20.

The basic solution of step 2 may be a basic solution including one or more selected from a group consisting of sodium hydroxide (NaOH), potassium hydroxide (KOH), magnesium hydroxide ($Mg(OH)_2$), calcium hydroxide ($Ca(OH)_2$), and barium hydroxide ($Ba(OH)_2$).

The basic solution of step 2 may be added so that the pH of the mixture is 10 to 12, preferably 10.5 to 11.5. If the pH of the mixture is less than 10, a problem may occur where the lithium recovery rate is lowered. If the pH of the mixture is more than 12, a problem where the lithium recovery rate is decreased may occur. If the basic solution of step 2 is sodium hydroxide and is added so that the pH exceeds 12, this may result in the formation of a very small amount of lithium hydroxide due to the addition of a large amount of sodium hydroxide and may result in an increase in the lithium concentration in the lithium recovery filtrate due to the solubility of the formed lithium hydroxide. Furthermore, the amount of sodium hydroxide used to raise the pH to 12 or higher is, 5.25 times as much for pH 13 and 10 times as much for pH 13.5, as that of pH 11, and so the process cost may increase due to the increase in the amount of chemicals being used, and also, there is a problem of increase in wastewater treatment costs due to excessive use of sodium hydroxide and an increase in waste disposal costs due to increase of process sludge.

In a method for preparing a solid lithium salt from a lithium solution according to an aspect of the present invention, the temperature of the pH-adjusted mixture is raised to make it react and filtered to recover lithium phosphate in step 3 in S30.

The temperature rise in step 3 may be performed by raising the temperature to a temperature of 70° C. to 90° C. and a reaction may be carried out by maintaining the temperature for 30 minutes to 90 minutes after raising the temperature. At this time, the lithium phosphate solid component can be easily prepared by the reaction.

The filtration in step 3 can recover the solid lithium phosphate prepared in the reaction, and the remaining filtrate can be treated as wastewater.

The filtration of step 3 may recover lithium phosphate containing 86 wt % to 95 wt % of lithium relative to the lithium in the lithium solution of step 1, and preferably, may recover lithium phosphate containing 93 wt % to 96 wt % of lithium relative to lithium in the lithium solution of step 1.

Step 3 may further include washing the lithium phosphate recovered by the filtration.

In a method for preparing a solid lithium salt from a lithium solution according to an aspect of the present invention, in step 4 in S40, an acid lithium solution is prepared in which distilled water and acid are added to the recovered lithium phosphate.

The preparation of the acid lithium solution in step 4 may be performed by adding distilled water weighing 2.5 to 4.5 times the weight of the recovered lithium phosphate and acid weighing 0.75 to 1.75 times the weight of the recovered lithium phosphate. Preferably, the acid lithium solution in step 4 may be prepared by adding distilled water weighing 3 to 4 times that of the recovered lithium phosphate and adding acid weighing 1 to 1.5 times that of the recovered lithium phosphate. If distilled water less than 2.5 times the weight of the recovered lithium phosphate is added, a problem may occur where the slurry agitation becomes difficult due to the viscosity of the phosphoric acid after a substitution reaction of phosphoric acid and sulfuric acid, and due to this, there is the possibility of an incomplete decomposition of lithium phosphate. If distilled water exceeding 4.5 times the weight of the recovered lithium phosphate is added, there is a concern that process time and energy consumption will increase in the following evaporative concentration step. Further, if acid less than 0.75 times the weight of the recovered lithium phosphate is added, a problem may occur where the recovery rate of lithium sulfate may be lowered during the evaporative concentration, and if acid more than 1.75 times the weight of the recovered lithium phosphate is added, a problem may occur where the amount of basic solution used is increased during the recovery of lithium phosphate due to excessive sulfate ion in phosphoric acid solution after the recovery of lithium sulfate by evaporative concentration.

The acid in step 4 may include one or more selected from a group consisting of sulfuric acid, nitric acid, hydrochloric acid, acetic acid, oxalic acid, citric acid and formic acid, and preferably sulfuric acid may be used.

Step 4 may further include the step of filtering after adding distilled water and acid. At this time, the residue generated in the filtration may include an organic matter and a partially precipitated lithium salt, and lithium may be recovered through water washing and the organic residue may be disposed. The water-washed lithium solution and the remaining filtrate may be used as an acid lithium solution for a post-stage process.

In a method for preparing a solid lithium salt from a lithium solution according to one aspect of the present invention, in step 5 in S50, a solid lithium salt is recovered by evaporative concentration of the lithium acid solution.

The evaporative concentration in step 5 may be performed 1 to 5 times, preferably 2 to 5 times, and more preferably 2 to 3 times.

Figure 2:
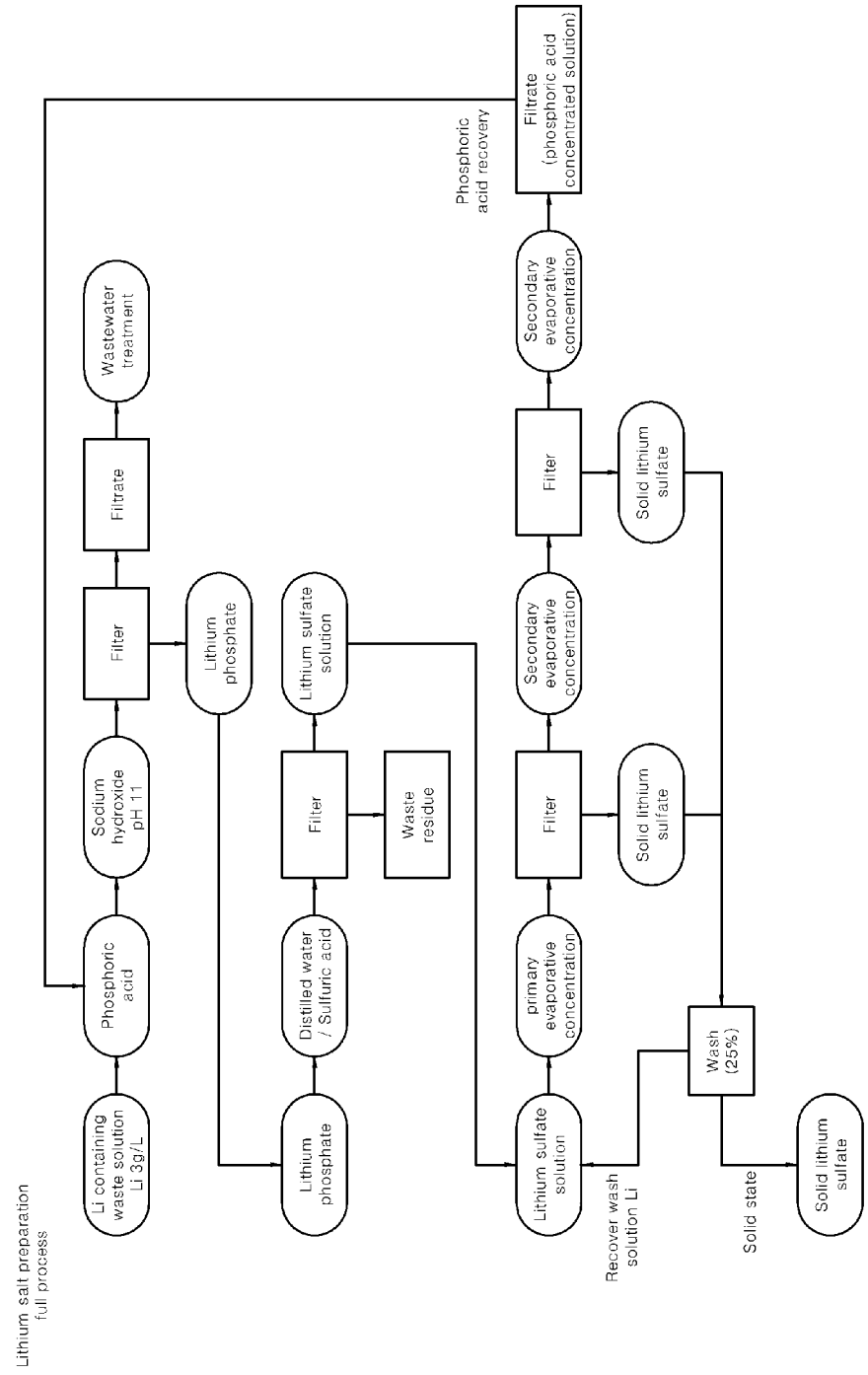
FIG. 2 is a schematic diagram showing another example of a method for preparing a solid lithium salt from a lithium solution according to an embodiment of the present invention.

Filtration may be performed after the evaporative concentration in step 5, and the filtrate generated in the filtration can be used as the phosphorus-containing material in step 1. As a detailed example, as shown in FIG. 2, the lithium salt of a solid state formed by performing filtration after evaporative concentration is made to be used in a post-stage process. Evaporative concentration and filtration is performed again on the remaining filtrate so that lithium salt of a solid state is made to be used in a post-stage process, and because a large amount of phosphoric acid is contained in the remaining filtrate, it can be made to be used as a phosphorus-containing material of step 1.

The evaporative concentration of step 5 may be performed by evaporating 50 wt % to 90 wt % of the water contained in the acid lithium solution.

A method for preparing a solid lithium salt from a lithium solution according to an aspect of the present invention may further include washing the lithium salt recovered in step 5, in step 5a.

The washing of step 5a may be performed with 10 wt % to 40 wt % of distilled water relative to the recovered lithium salt.

The washing of step 5a may be performed for the purpose of removing a phosphorus component of the recovered lithium salt, and the resulting wash solution may be used for to prepare the acid lithium solution of step 4.

According to another aspect of the present invention, there is provided a method for preparing a solid lithium sulfate from a waste solution of a waste lithium battery, including the steps of, preparing a mixture in which phosphoric acid is added to a waste solution of a waste lithium battery containing lithium in step i;

adding a basic solution to the prepared mixture to adjust the pH to 10 to 12 in step ii;

raising the temperature of the pH-adjusted mixture to a temperature of 70° C. to 90° C. to make it react and recovering lithium phosphate by filtration in step iii;

preparing a lithium sulfate solution in which distilled water and sulfuric acid are added to the recovered lithium phosphate, in step iv; and recovering a solid lithium sulfate by evaporative concentration of the lithium sulfate solution, in step v.

In a method for preparing a solid lithium salt from a waste solution of a waste lithium battery according to an aspect of the present invention, a mixture in which phosphoric acid is added to a waste solution of a waste lithium battery containing lithium is prepared in step i.

The lithium concentration of the waste solution of the waste lithium battery in step i may be the same as the lithium concentration of the lithium solution of step 1.

The phosphoric acid addition ratio in step i may be the same as the phosphorus-containing material addition ratio in step 1.

In a method for preparing a solid lithium salt from a waste solution of a waste lithium battery according to an aspect of the present invention, a basic solution is added to the prepared mixture to adjust the pH to 10 to 12 in step ii.

The type of basic solution of step ii may be the same as the basic solution of step 2.

The basic solution of step ii may be added so that the pH of the mixture is 10 to 12, preferably 10.5 to 11.5. If the pH of the mixture is less than 10, a problem may occur where the lithium recovery rate is lowered. If the pH of the mixture is more than 12, a problem where the lithium recovery rate is decreased may occur. If the basic solution is sodium hydroxide and is added so that the pH exceeds 12, this may result in the formation of a very small amount of lithium hydroxide due to the addition of a large amount of sodium hydroxide and may result in an increase in the lithium concentration in the lithium recovery filtrate due to the solubility of the formed lithium hydroxide. Furthermore, the amount of sodium hydroxide used to raise the pH to 12 or higher is, 5.25 times as much for pH 13 and 10 times as much for pH 13.5, as that of pH 11, and so the process cost may increase due to the increase in the amount of chemicals being used, and also, there is a problem of increase in wastewater treatment costs due to excessive use of sodium hydroxide and an increase in waste disposal costs due to increase of process sludge.

In the method for preparing a solid lithium salt from a waste solution of a waste lithium battery according to an aspect of the present invention, the pH-adjusted mixture is made to react by raising its temperature to 70° C. to 90° C. and filtered to recover lithium phosphate in step iii.

The reaction maintaining time airier raising the temperature in step iii may be the same as step 3.

The filtration in step iii can recover a solid state lithium phosphate formed in the reaction, and the remaining filtrate may be treated as wastewater.

The lithium phosphate content that is recovered relative to the lithium content of a waste solution of a waste lithium battery which is a starting material in the filtration of step iii may be the same as the lithium phosphate content that is recovered relative to the lithium content of the waste solution of step 3.

Step iii may further comprise washing the lithium phosphate recovered by the filtration.

In the method for preparing a solid lithium salt from a waste solution of a waste lithium battery according to an aspect of the present invention, a lithium sulfate solution in which distilled water and sulfuric acid are added to the recovered lithium phosphate is prepared in step iv.

The added weight of distilled water and sulfuric acid added during the preparation of the lithium sulfate solution of step iv may be the same as the added weight of distilled water and acid in step 4.

Step iv may further include the step of filtering after adding distilled water and acid. At this time, the residue generated in the filtration may include an organic matter and a partially precipitated lithium sulfate, and lithium may be recovered through water washing and the organic residue may be disposed. The water-washed lithium solution and the remaining filtrate may be used as a lithium sulfate solution for a post-stage process.

In a method for preparing a solid lithium salt from a waste solution of a waste lithium battery according to one aspect of the present invention, in step v, a solid lithium sulfate is recovered by evaporative concentration of the lithium sulfate solution.

The evaporative concentration in step v may be performed 1 to 5 times, preferably 2 to 5 times, and more preferably 2 to 3 times.

Filtration may be performed after the evaporative concentration in step v, and the filtrate generated in the filtration can be used as the phosphorus-containing material in step i. As a detailed example, as shown in FIG. 2, the lithium sulfate of a solid state formed by performing filtration after evaporative concentration is made to be used in a post-stage process. Evaporative concentration and filtration is performed again on the remaining filtrate so that lithium sulfate of a solid state is made to be used in a post-stage process, and because a large amount of phosphoric acid is contained in the remaining filtrate, it can be made to be used in the mixture preparation of step i.

The evaporative concentration of step v may be performed by evaporating 50 wt % to 90 wt % of the water contained in the lithium sulfate solution.

In a method for preparing a solid lithium sulfate from a lithium solution according to an aspect of the present invention, washing the solid lithium sulfate recovered in step v may be further included as step v+.

The washing of step v+ may be performed by the addition of 10 wt % to 40 wt % of distilled water relative to the recovered solid lithium sulfate.

The washing of step v+ may be performed for the purpose of removing a phosphorus component of the recovered solid lithium sulfate, and a wash solution generated at this time may be used to prepare the lithium sulfate solution of step iv.

According to another aspect of the present invention, there is provided a method for preparing a solid lithium sulfate from a waste solution of a waste lithium battery, including the steps of, preparing a mixture in which phosphoric acid is added 0.8 to 1.2 times the lithium equivalent of a waste solution of a waste lithium battery containing lithium at a concentration of 1.5 g/L to 6.0 g/L, to the waste solution in step a;

adding sodium hydroxide to the prepared mixture to adjust the pH to 10 to 12 in step b;

raising the temperature of the pH-adjusted mixture to a temperature of 70° C. to 90° C. and making it react for 30 to 90 minutes and recovering lithium phosphate by filtration in step c;

preparing a lithium sulfate solution in which distilled water is added 2.5 to 4.5 times the lithium phosphate by weight and sulfuric acid is added 0.75 to 1.75 times the lithium phosphate by weight it to the recovered lithium phosphate, in step d; and recovering and washing a solid lithium sulfate by evaporative concentration and filtration of the lithium sulfate solution, wherein the evaporative concentration and filtration may be performed two to five times, in step e.

In a method for preparing a solid lithium salt from a waste solution of a waste lithium battery according to an aspect of the present invention, the sodium hydroxide of step b may be added so that the pH of the mixture becomes 10 to 12, preferably 10.5 to 11.5. If the pH of the mixture is less than 10, a problem may occur where the lithium recovery rate is lowered. If the pH of the mixture is more than 12, a problem where the lithium recovery rate is decreased may occur. This may result in the formation of a very small amount of lithium hydroxide due to the addition of a large amount of sodium hydroxide and may result in an increase in the lithium concentration in the lithium recovery filtrate due to the solubility of the formed lithium hydroxide. Furthermore, the amount of sodium hydroxide used to raise the pH to 12 or higher is, 5.25 times as much for pH 13 and 10 times as much for pH 13.5, as that of pH 11, and so the process cost may increase due to the increase in the amount of chemicals being used, and also, there is a problem of increase in wastewater treatment costs due to excessive use of sodium hydroxide and an increase in waste disposal costs due to increase of process sludge.

In a method for preparing a solid lithium salt from a waste solution of a waste lithium battery according to an aspect of the present invention, the filtration in step c can recover a solid state lithium phosphate formed in the above reaction, and the remaining filtrate may be treated as wastewater.

The lithium phosphate content that is recovered relative to the lithium content of a waste solution of a waste lithium battery which is a starting material in the filtration of step c may be the same as the lithium phosphate content that is recovered relative to the lithium content of the waste solution of step 3.

Step c may further comprise washing the lithium phosphate recovered by the filtration.

In a method for preparing a solid lithium salt from a waste solution of a waste lithium battery according to an aspect of the present invention, the added weight of distilled water and sulfuric acid added during the preparation of the lithium sulfate solution of step d may be the same as the added weight of distilled water and acid in step 4.

Step d may further include the step of filtering after adding distilled water and acid. At this time, the residue generated in the filtration may include an organic matter and a partially precipitated lithium sulfate, and lithium may be recovered through water washing and the organic residue may be disposed. The water-washed lithium solution and the remaining filtrate may be used as a lithium sulfate solution for a post-stage process.

In a method for preparing a solid lithium salt from a waste solution of a waste lithium battery according to an aspect of the present invention, the evaporative concentration of step e may be performed 2 to 5 times, and more preferably 2 to 3 times.

The filtrate generated in the final filtration of step e can be used during the preparation of the mixture of step a. As a detailed example, as shown in FIG. 2, the lithium sulfate of a solid state formed by performing filtration after evaporative concentration is made to be used in a post-stage process. Evaporative concentration and filtration is performed again on the remaining filtrate so that lithium sulfate of a solid state is made to be used in a post-stage process, and because a large amount of phosphoric acid is contained in the remaining filtrate, it can be made to be used during the preparation of the mixture of step a.

The evaporative concentration of step e may be performed by evaporating 50 wt % to 90 wt % of the water contained in the lithium sulfate solution.

The washing of step e may be performed with the addition of 10 wt % to 40 wt % of distilled water relative to the recovered solid lithium sulfate.

The washing of step e may be performed for the purpose of removing a phosphorus component of the recovered solid lithium sulfate, and the resulting wash solution may be used for to prepare the lithium sulfate solution of step d.

The above preparation method (step 1 to step 5, step i to step v, step a to step e) has an advantage where lithium that is disposed process-wise may be used to its fullest compared to the prior art, by recycling the filtrates and waste solutions generated in each step.

The lithium salt prepared using the above-described preparation method (step 1 to step 5, step i to step v, step a to step e) may contain 90 wt % to 95 wt % of lithium relative to the lithium of a lithium solution.

According to another aspect of the present invention, there is provided a method for preparing a solid lithium carbonate from a lithium solution including the steps of, preparing a mixture in which a phosphorus-containing material is added to a lithium solution in step 1 in S10;

adding a basic solution to the prepared mixture to adjust the pH in step 2 in S20;

making the pH-adjusted mixture react by raising its temperature and filtering to recover lithium phosphate in step 3 in S30;

preparing an acid lithium solution in which distilled water and acid are added to the recovered lithium phosphate, in step 4 in S40; and recovering a solid lithium salt by evaporative concentration of the acid lithium solution, in step 5 in S50, adjusting the pH by adding distilled water and a basic solution to the recovered solid lithium salt, in step 6 in S60; and preparing a solid lithium carbonate by adding a carbonate to the pH-adjusted solution, in step 7 in S70.

In a method for preparing a solid lithium carbonate from a lithium solution according to an aspect of the present invention, step 1 to step 5 (S10 to S50) may be performed as described above.

In a method for preparing a solid lithium carbonate from a lithium solution, in step 6 in S60, distilled water and a basic solution is added to the recovered solid lithium salt to adjust the pH. At this time, pH adjustment is performed for the purpose of removing phosphorus components remaining in the lithium salt even after washing, and through pH adjustment, the phosphate of the lithium salt solution precipitates into lithium phosphate, and this is usable in step 4.

The amount of distilled water added in step 6 may be 2 to 20 times the weight of the recovered solid lithium salt, and preferably, 2 to 10 times may be added. If an amount of distilled water less than 2 times the weight of the recovered solid lithium salt is added, a problem of not dissolving completely may occur due to the solubility of the lithium salt, and the if an amount of distilled water exceeding 20 time the weight of the recovered solid lithium salt, the problems of lowered recovery rate and increase in wastewater may occur.

The basic solution of step 6 may include one or more selected from a group consisting of sodium hydroxide (NaOH), potassium hydroxide (KOH), magnesium hydroxide ($Mg(OH)_2$), calcium hydroxide ($Ca(OH)_2$), barium hydroxide ($Ba(OH)_2$), and a carbonate.

In one embodiment, the concentration of the basic solution of step 6 may be 10 wt % to 30 wt %, but is not limited thereto.

In the pH adjustment in step 6, the basic solution may be added so the pH is adjusted to 9 to 11. If the pH is less than 9, a problem of the phosphorus in the lithium solution not being completely removed may occur. If the pH exceeds 11, there is a possibility of a cost increase due to unnecessary use of basic solution and a loss problem due to a coprecipitation effect of a part of lithium may occur. Of course, the precipitated lithium phosphate can be used in step 4, but an unnecessary increase in the process cost is obvious.

The pH adjustment of step 6 may be performed at a temperature of 60° C. to 90° C. for 30 minutes to 90 minutes, and preferably may be performed at a temperature of 70° C. to 90° C. for 45 minutes to 75 minutes.

In step 6, filtration may be performed after the pH adjustment, and the filtrate from the filtration may be used to prepare the acid lithium solution of step 4. That is, the residue resulting from the filtration may remain as a residue of lithium phosphate and lithium salt of step 5 and the filtrate may be used in a post-stage process.

In a method for preparing a solid lithium carbonate from a lithium solution, in step 7 in S70, a carbonate is added to the pH-adjusted solution to prepare a solid lithium carbonate.

The carbonate of step 7 may be one or more selected from a group consisting of sodium carbonate ($Na_2CO_3$), sodium bicarbonate ($NaHCO_3$), potassium carbonate ($K_2CO_3$), potassium bicarbonate ($KHCO_3$), calcium carbonate ($CaCO_3$), magnesium carbonate ($MgCO_3$), barium carbonate ($BaCO_3$) and dolomite ($CaMg(CO_3)_2$), and preferably may be sodium carbonate.

The carbonate addition in the step 7 may be performed by adding a carbonate solution having a concentration of 5 wt % to 50 wt %, but the present invention is not limited thereto.

After the addition of the carbonate in step 7, the reaction can be carried out at a temperature of 80° C. to 90° C. for 1 hour to 2 hours.

In step 7, filtration may be performed after adding the carbonate, and the filtrate generated in the filtration may contain a small amount of lithium. Therefore, the filtrate may be used in the preparation of the mixture of step 1.

Step 7 can perform the washing of the solid lithium carbonate which is the residue after the filtration and the wash solution generated by the washing may also contain a small amount of lithium and can be used in the preparation of the mixture of step 1.

The lithium carbonate prepared through the above-described method (steps 1 to 7, S10 to S70), when performing the above-described method once, a solid lithium carbonate including 60 wt % to 80 wt % of lithium relative to the lithium content of a lithium waste solution of step 1 may be prepared, and if the above method is continuously performed and stabilized, only 3 wt % to 8 wt % of lithium relative to the lithium content of the lithium waste solution in step 1 can be disposed without being used.

Further, according to an aspect of the present invention, there is an advantage where the filtrate resulting from the final filtration of step 5, the wash solution resulting from the washing of step 5a, the residue resulting from the filtration of step 6, the filtrate and wash solution resulting from the filtration and washing of step 7 and the like may be recycled and used, thereby it is possible to utilize the lithium included in a lithium solution which is the initial starting material.

According to another aspect of the present invention, there is provided a method for preparing a solid lithium carbonate from a waste solution of a waste lithium battery, including the steps of, preparing a mixture in which phosphoric acid is added to a waste solution of a waste lithium battery containing lithium in step i;

adding a basic solution to the prepared mixture to adjust the pH to 10 to 12 in step ii;

raising the temperature of the pH-adjusted mixture to make it react and recovering lithium phosphate by filtration in step iii;

preparing a lithium sulfate solution in which distilled water and sulfuric acid are added to the recovered lithium phosphate, in step iv;

recovering a solid lithium sulfate by evaporative concentration of the lithium sulfate solution, in step v;

adjusting the pH by adding distilled water and a basic solution to the recovered solid lithium sulfate, in step vi; and preparing a solid lithium carbonate by adding a carbonate to the pH-adjusted solution, in step vii.

Steps i to v may be performed as described above.

The added amount of distilled water in step vi may be the same as the added amount of distilled water in step 6.

The concentration of the basic solution of step vi may be the same as the concentration of the basic solution of step 6.

The pH adjustment of step vi may be the same as the pH adjustment of step 6.

The temperature and maintaining time during pH adjustment of step vi may be the same as the temperature and maintaining time of step 6.

In step vi, filtration may be performed after the pH adjustment, and the residue resulting from the filtration may be used in the preparation of lithium sulfate solution of step iv. That is, the residue resulting from the filtration may remain as a residue of lithium phosphate and solid lithium sulfate of step v and the filtrate may be used in a post-stage process.

The carbonate of step vii may be the same as the carbonate of step 7.

The addition of carbonate of step vii may be performed where a carbonate solution having a concentration of 5 wt % to 50 wt % is added, but it is not limited thereto.

After the addition of carbonate of step vii, a reaction may be carried out at a temperature of 80° C. to 90° C. and maintained for 1 hour to 2 hours.

In step vii, filtration may be performed after the carbonate addition, and the residue resulting from the filtration may include a small amount of lithium, so it may be used in the preparation of the mixture of step i.

In step vii, washing of the solid lithium carbonate which is the residue may be performed after the filtration, and the wash solution resulting from the washing may also include a small amount of lithium, so it may be used in the preparation of the mixture of step i.

The lithium carbonate prepared through the above-described method (steps i to vii), when performing the above-described method once, a solid lithium carbonate including 60 wt % to 80 wt % of lithium relative to the lithium content of a lithium waste solution of step i may be prepared, and if the above method is continuously performed and stabilized, only 3 wt % to 8 wt % of lithium relative to the lithium content of the lithium waste solution in step i can be disposed without being used.

Further, according to an aspect of the present invention, there is an advantage where the filtrate resulting from the final filtration of step v, the wash solution resulting from the washing of step v+, the residue resulting from the filtration of step vi, the filtrate and wash solution resulting from the filtration and washing of step vii and the like may be recycled and used, thereby it is possible to utilize the lithium included in a lithium solution which is the initial starting material.

According to another aspect of the present invention, there is provided a method for preparing a solid lithium carbonate from a waste solution of a waste lithium battery, including the steps of, preparing a mixture in which phosphoric acid is added 0.8 to 1.2 times the lithium equivalent of a waste solution of a waste lithium battery containing lithium at a concentration of 1.5 g/L to 6.0 g/L, to the waste solution in step a;

adding sodium hydroxide to the prepared mixture to adjust the pH to 10 to 12 in step b;

raising the temperature of the pH-adjusted mixture to a temperature of 70° C. to 90° C. and making it react for 30 to 90 minutes and recovering lithium phosphate by filtration in step c;

preparing a lithium sulfate solution in which distilled water is added 2.5 to 4.5 times the lithium phosphate by weight and sulfuric acid is added 0.75 to 1.75 times the lithium phosphate by weight to the recovered lithium phosphate, in step d;

recovering and washing a solid lithium sulfate by evaporative concentration and filtration of the lithium sulfate solution, wherein the evaporative concentration and filtration may be performed two to five times, in step e;

adding distilled water in an amount 2 to 20 times the weight of the lithium sulfate to the recovered solid lithium sulfate and filtering after adding a sodium hydroxide solution to adjust the pH to 9 to 11, in step f; and adding a sodium carbonate solution at a concentration of 5 wt % to 50 wt % to the filtered filtrate and preparing a solid lithium carbonate by filtering and washing, in step g.

Steps a to e may be performed as described above.

The concentration of the sodium hydroxide of step f may be the same as the concentration of the basic solution of step 6.

The temperature and maintaining time during adjustment of step f may be the same as the temperature and maintaining time of step 6.

In step f, the residue resulting from the filtration may be used in the preparation of lithium sulfate solution of step d. That is, the residue resulting from the filtration may remain as a residue of lithium phosphate and solid lithium sulfate of step e and the filtrate may be used in a post-stage process.

After the addition of carbonate of step g, a reaction may be carried out at a temperature of 80° C. to 90° C. and maintained for 1 hour to 2 hours.

In step g, the residue resulting from the filtration may include a small amount of lithium, so it may be used in the preparation of the mixture of step a.

The wash solution resulting from the washing of step g may also include a small amount of lithium, so it may be used in the preparation of the mixture of step a.

The lithium carbonate prepared through the above-described method (steps a to g), when performing the above-described method once, a solid lithium carbonate including 60 wt % to 80 wt % of lithium relative to the lithium content of a lithium waste solution of step a may be prepared, and if the above method is continuously performed and stabilized, only 3 wt % to 8 wt % of lithium relative to the lithium content of the lithium waste solution in step a can be disposed without being used.

Further, according to an aspect of the present invention, there is an advantage where the filtrate resulting from the final filtration of step e, the wash solution resulting from the washing of step e, the residue resulting from the filtration of step f, the filtrate and wash solution resulting from the filtration and washing of step g and the like may be recycled and used, thereby it is possible to utilize the lithium included in a lithium solution which is the initial starting material.

According to another aspect of the present invention, there is provided a solid lithium carbonate prepared by the methods above (steps 1 to 7, steps i to vii, steps a to g), including 90 wt % to 95 wt % of lithium relative to the lithium of the solutions of steps 1, i, and a.

Hereinafter, the present invention will be described in more detail with reference to examples and experimental examples. However, the following examples and experimental examples are for illustrative purposes only and are not intended to limit the scope of the present invention.

<Example 1> Preparation Process 1 of Solid Lithium Sulfate

Step 1: 63 kg of lithium waste solution of a waste lithium secondary battery (lithium concentration: 3 g/L) was provided. Phosphoric acid was added to the waste solution at 1 molar equivalent relative to lithium.

Step 2: The pH was adjusted to 11 by adding sodium hydroxide (25% concentration) to the phosphoric acid-added waste solution.

Step 3: The pH-adjusted waste solution was raised to a temperature of 80° C., made to react for 1 hour, and filtered to recover 1 kg of solid lithium phosphate; which was washed with distilled water.

Step 4: 3.5 times weight (3.5 kg) of distilled water and 1.25 times weight (1.25 kg) of sulfuric acid (95%) relative to the solid lithium phosphate were added and filtered to prepare 5.75 kg of lithium sulfate solution.

Step 5: The lithium sulfate solution was subjected to primary evaporative concentration and was filtered to separate a primary solid lithium sulfate (1.18 kg) and a primary filtrate (2.2 kg). The primary filtrate was subjected to secondary evaporative concentration, and was filtered to separate a secondary solid lithium sulfate (0.32 kg) and a final filtrate (0.60 kg), and then the final filtrate was used in the phosphoric acid addition process of step 1.

Step 5a: 20 wt % of distilled water (0.30 kg) relative to the separated solid lithium sulfate (1.18+0.32=1.5 kg) was added and washed, and the wash solution (0.38 kg) resulting from the washing was used in preparing, the lithium sulfate solution of step 4.

<Example 2> Preparation Process of Solid Lithium Sulfate, Step 2 pH 10

Solid lithium sulfate was prepared in the same manner as in Example 1, except that in step 2 of Example 1, the pH was adjusted to 10.

<Example 3> Preparation Process of Solid Lithium Sulfate, Step 2 pH 12

Solid lithium sulfate was prepared in the same manner as in Example 1, except that in step 2 of Example 1, the pH was adjusted to 12.

<Example 4> Preparation Process of Solid Lithium Sulfate, Step 3 70° C.

Solid lithium sulfate was prepared in the same manner as in Example 1, except that in step 3 of Example 1, the temperature was raised to 70° C.

<Example 5> Preparation Process of Solid Lithium Sulfite, Step 3 90° C.

Solid lithium sulfate was prepared in the same manner as in Example 1, except that in step 3 of Example 1, the temperature was raised to 90° C.

<Comparative Example 1> Preparation Process of Solid Lithium Sulfate, Step 2 pH 9

Solid lithium sulfate was prepared in the same manner as in Example 1, except that in step 2 of Example 1, the pH was adjusted to 9.

<Comparative Example 2> Preparation Process of Solid Lithium Sulfate, Step 2 pH 13

Solid lithium sulfate was prepared in the same manner as in Example 1, except that in step 2 of Example 1, the pH was adjusted to 13.

<Comparative Example 3> Preparation Process of Solid Lithium Sulfate, Step 2 pH 13.5

Solid lithium sulfate was prepared in the same manner as in Example 1, except that in step 2 of Example 1, the pH was adjusted to 13.5.

<Comparative Example 4> Preparation Process of Solid Lithium Sulfate, Step 3 50° C.

Solid lithium sulfate was prepared in the same manner as in Example 1, except that in step 3 of Example 1, the temperature was raised to 50° C.

<Comparative Example 5> Preparation Process of Solid Lithium Sulfate, Step 3 100° C.

Solid lithium sulfate was prepared in the same manner as in Example 1, except that in step 3 of Example 1, the temperature was raised to 100° C.

<Comparative Example 6> Preparation Process of Solid Lithium Sulfate, Step 2 pH 8

Solid lithium sulfate was prepared in the same manner as in Example 1, except that in step 2 of Example 1, the pH was adjusted to 8.

<Comparative Example 7> Preparation Process of Solid Lithium Sulfate, Step 2 pH 7

Solid lithium sulfate was prepared in the same manner as in Example 1, except that in step 2 of Example 1, the pH was adjusted to 7.

<Comparative Example 8> Preparation Process of Solid Lithium Sulfate, Step 3 60° C.

Solid lithium sulfate was prepared in the same manner as in Example 1, except that in step 3 of Example 1, the temperature was raised to 60° C.

<Comparative Example 9> Preparation Process of Solid Lithium Sulfate, Step 3 25° C.

Solid lithium sulfate was prepared in the same manner as in Example 1, except that in step 3 of Example 1, the temperature was raised to 25° C.

<Experimental Example 1> Measurement of Lithium Recovery Rate According to Each Condition In Examples 1 to 5 and Comparative Examples 1 to 9, lithium content of lithium sulfate prepared as compared to lithium in the initial lithium waste solution was measured. The results are shown in Table 1 and FIG. 5.

TABLE 1

| Classification | Condition | Lithium recovery rate (%) |
| --- | --- | --- |
| Example 1 | Standard | 93 |
| Example 2 | Step 2 pH 10 | 85 |
| Example 3 | Step 2 pH 12 | 93 |
| Example 4 | Step 3 70° C. | 91 |
| Example 5 | Step 3 90° C. | 93 |
| Comparative Example 1 | Step 2 pH 9 | 64 |
| Comparative Example 2 | Step 2 pH 13 | 91 |
| Comparative Example 3 | Step 2 pH 13.5 | 85 |
| Comparative Example 4 | Step 3 50° C. | 75 |
| Comparative Example 5 | Step 3 100° C. | 93 |
| Comparative Example 6 | Step 2 pH 8 | 51 |
| Comparative Example 7 | Step 2 pH 7 | 45 |
| Comparative Example 8 | Step 3 60° C. | 85 |
| Comparative Example 9 | Step 3 25° C. | 48 |

Figure 5:
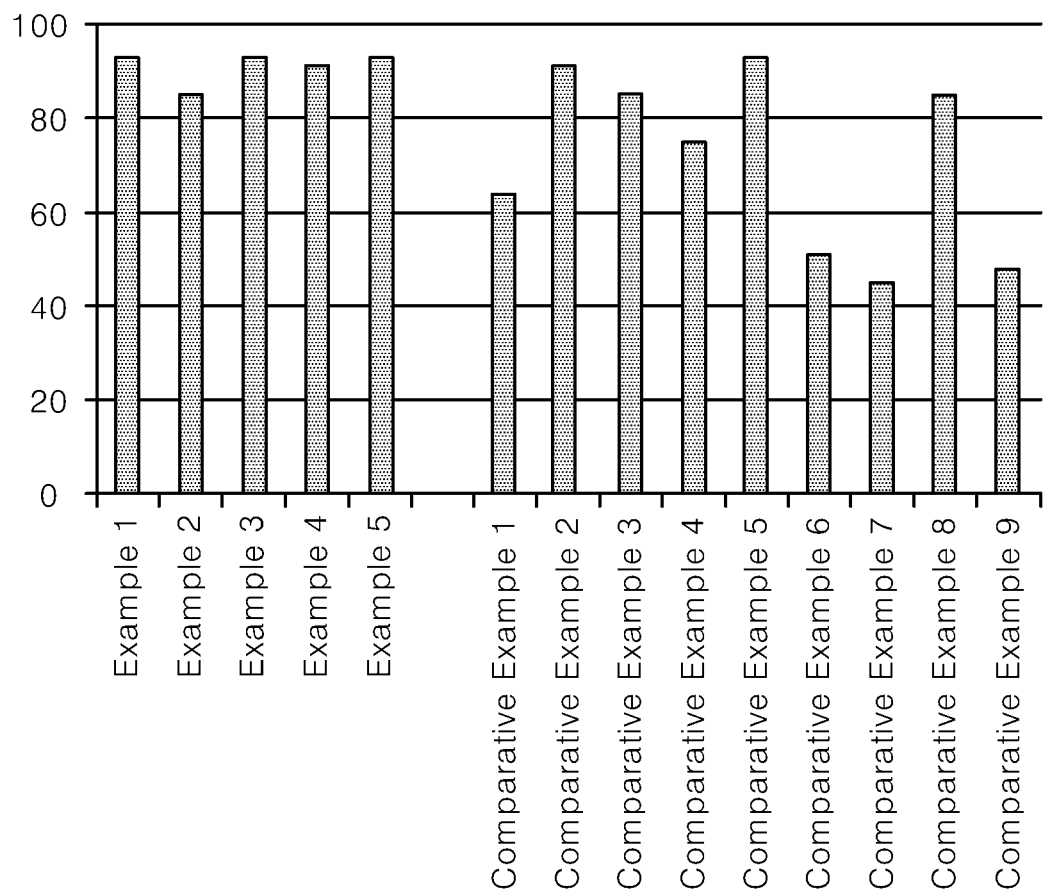
FIG. 5 is a graph showing the recovery rate of lithium according to each Example and Comparative Example of the present invention.
Figure 6:
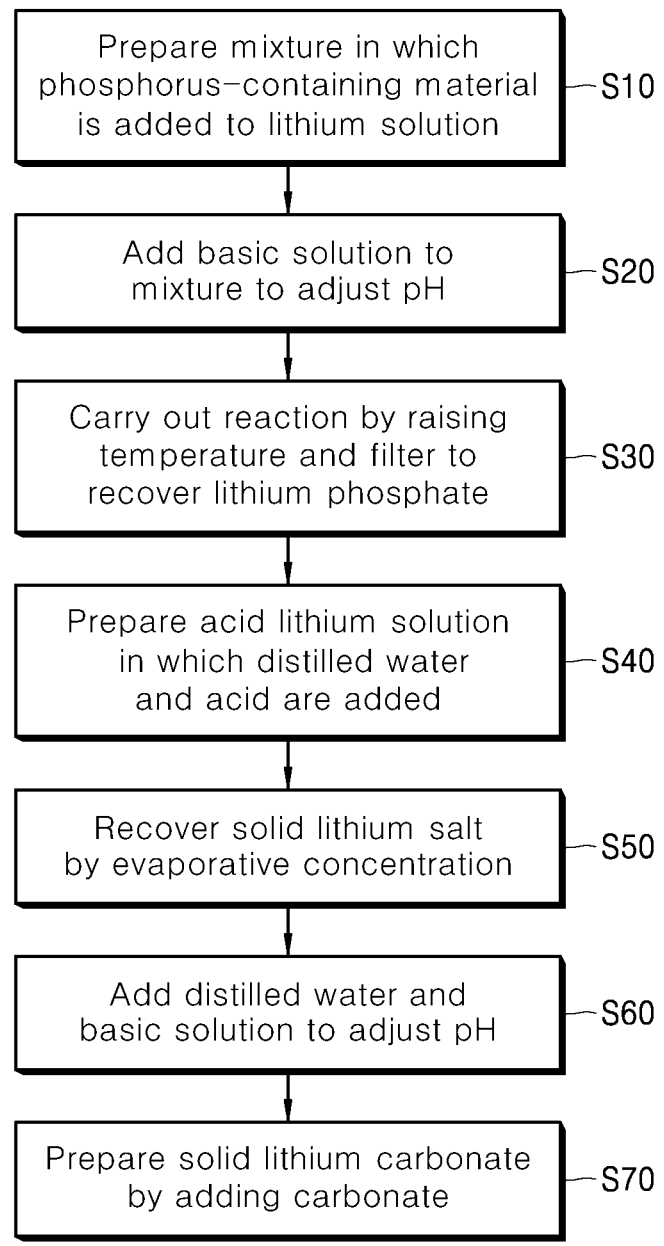
FIG. 6 is a flowchart showing an example of a method for preparing solid lithium carbonate from a lithium solution according to an embodiment of the present invention.
Figure 7:
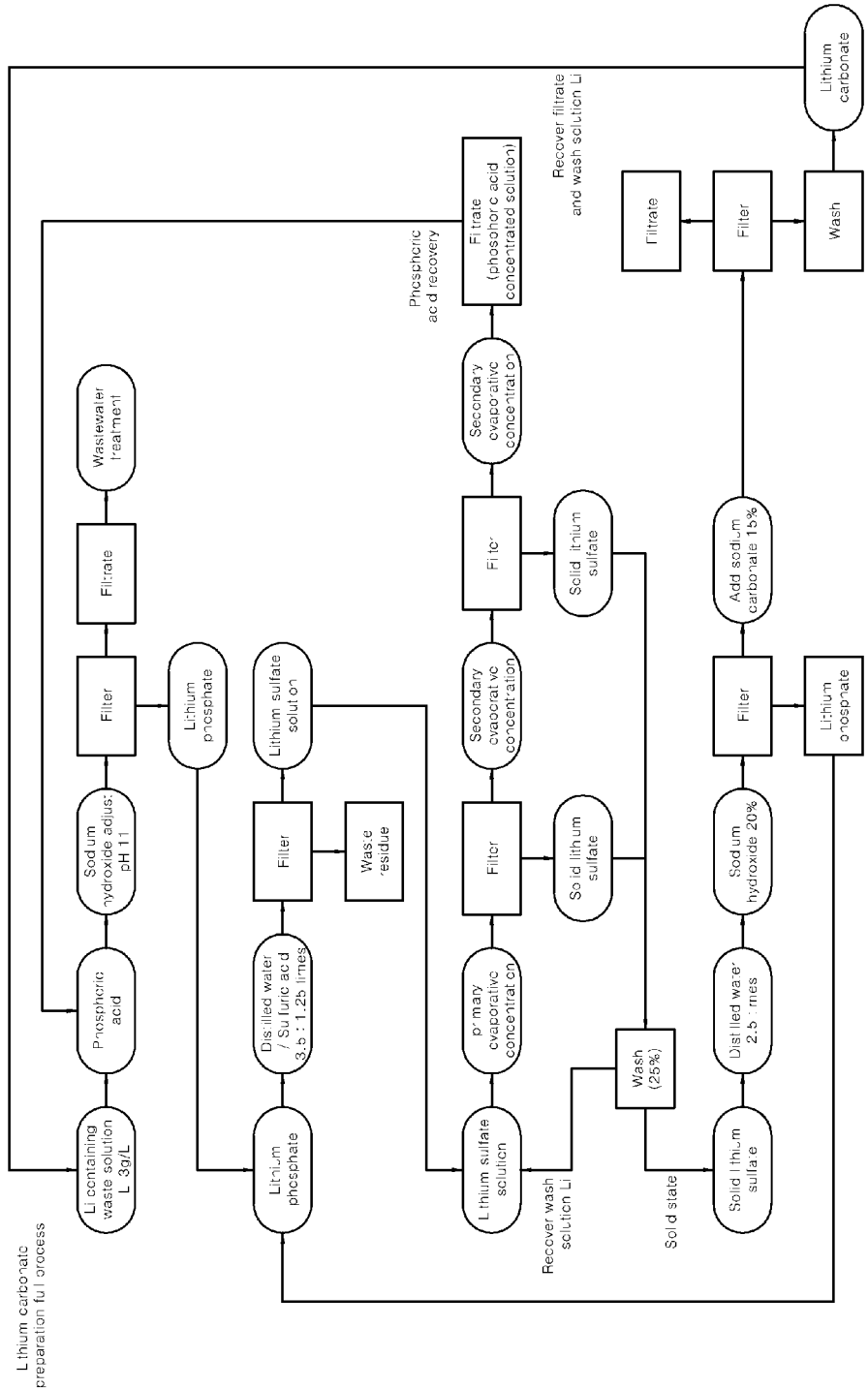
FIG. 7 is a flowchart schematically showing an example of a method for preparing solid lithium carbonate from a lithium solution according to an embodiment of the present invention.

As shown in Table 1 and FIG. 5, in Examples 1 to 3, in which the pH was adjusted to 10 to 12 through sodium hydroxide in step 2, the lithium content of lithium sulfate prepared were all 85 wt % or more relative to the waste solution lithium, and Example 1 with the pH adjusted to 11 was found to show the best lithium recovery rate. On the other hand, Comparative Example 1 in which the pH was adjusted to 9 showed a lower value, and Comparative Examples 2 and 3 in which the pH was adjusted to 13 and 13.5 were lower in recovery rate than in Example 1, and sodium hydroxide was used excessively in an amount of 5 to 10 times more than that of Example 1, thereby causing the process cost to increase and resulting in an adverse effect of increase in wastewater treatment costs. The reason why the recovery rates of Comparative Examples 2 and 3 are lowered is because, as described above, a part of lithium is formed into lithium hydroxide due to the excessive amount of sodium hydroxide added, and lithium is dissolved again due to solubility of lithium hydroxide, resulting in an increase in lithium concentration in the lithium recovered filtrate during the filtration of step 3.

Examples 1, 4 and 5 in which the temperature was raised to be adjusted to a temperature of 70° C. to 90° C., show that the lithium content of the prepared lithium sulfate were all 91 wt % or more compared to the lithium of a waste solution, and in Comparative Example 5 at 100° C., it shows a similar recovery rate as in Example 1, but shows a poor result in terms of efficiency relative to the energy cost to be charged for the temperature rise. In Comparative Example 4, in which the temperature was raised to 50° C., it was confirmed that the lithium recovery rate was lowered and this seems to be due to the solubility of lithium phosphate being inversely proportional with temperature wherein the solubility becomes lower as the temperature is higher and becomes higher as the temperature is lower.

<Experimental Example 2> XRD Analysis of Product in Each Step

Figure 3:
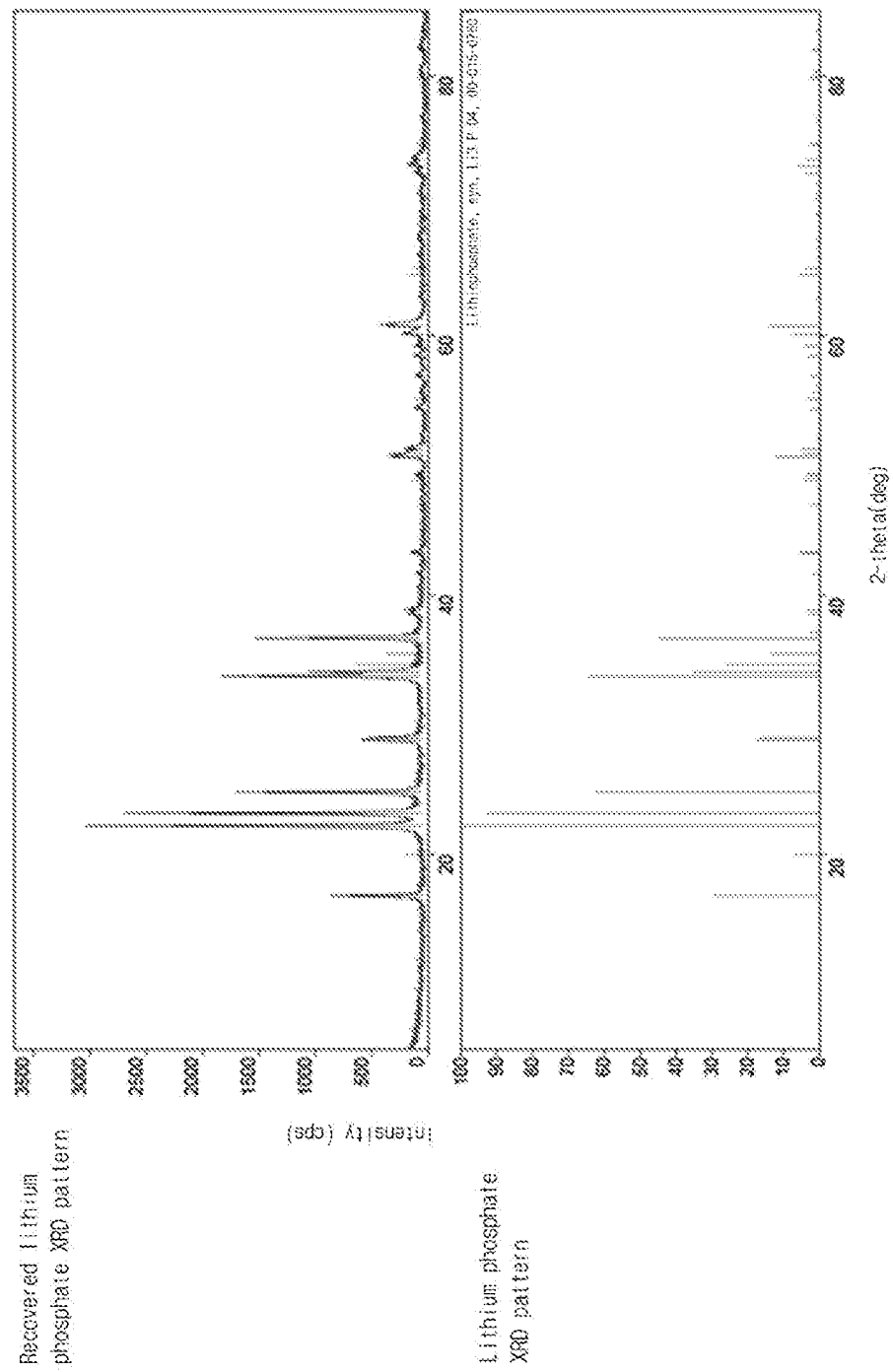
FIGS. 3 and 4 are graphs showing the results of an XRD analysis of recovered lithium compounds (lithium phosphate, lithium sulfate).
Figure 4:
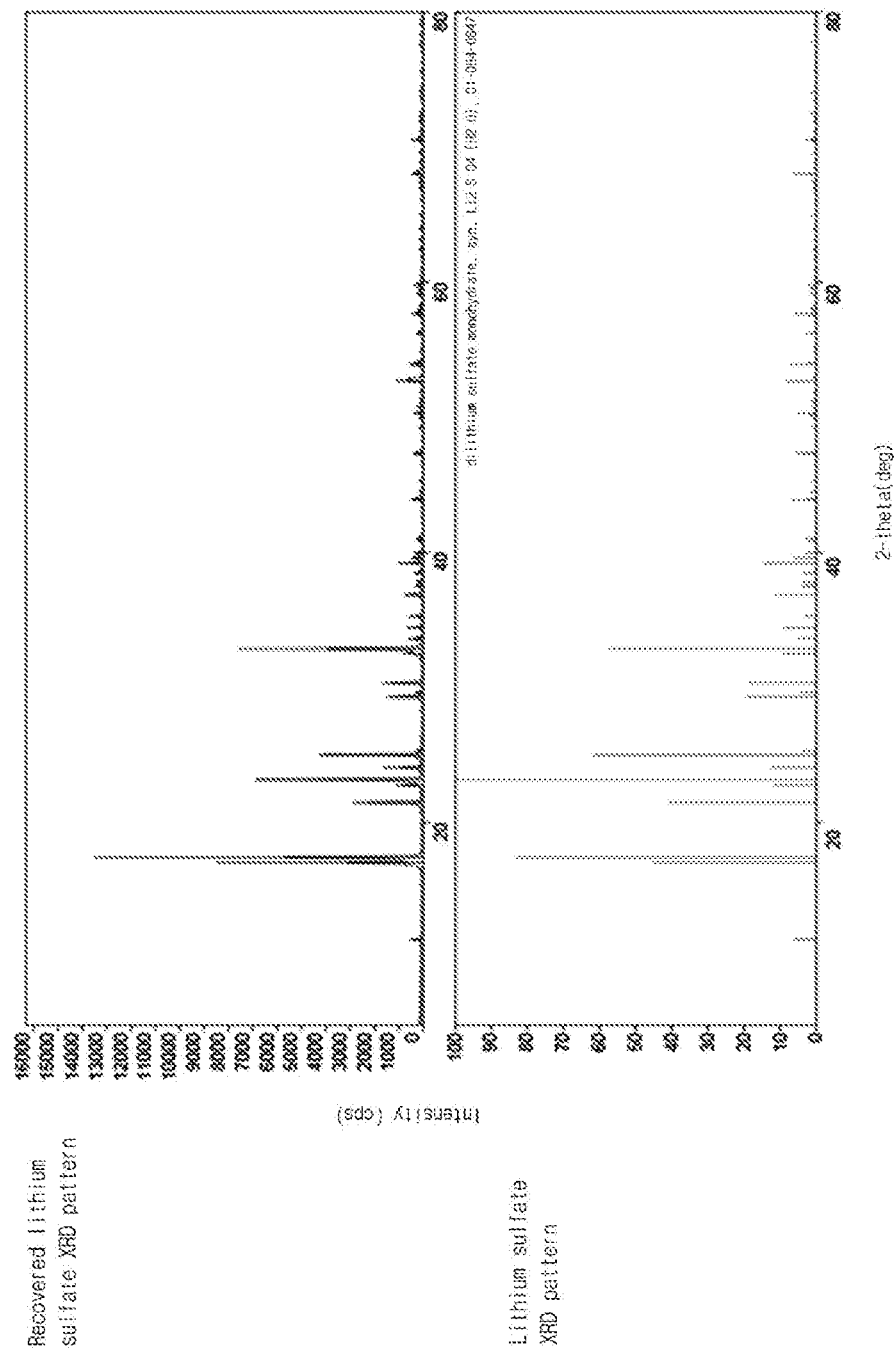

In Example 1, X-ray diffraction analysis of lithium phosphate and lithium sulfate produced in each step was carried out, and the results are shown FIG. 3 and FIG. 4.

As shown in FIG. 3 and FIG. 4, it was confirmed that lithium phosphate recovered in step 3 and lithium sulfate recovered in step 5 were easily formed.

<Example i> Preparation Process 1 of Solid Lithium Carbonate

Step 1 to Step 5: A washed solid lithium sulfate was prepared in the same manner as in Example 1.

Step 6: 2.5 times by weight of distilled water and a 25 wt % sodium hydroxide solution was added to the washed solid lithium sulfate solid (1.42 kg), to adjust the pH to 10, and was maintained at 80° C. for 1 hour, and then filtered. The residue (lithium phosphate, 0.01 kg) produced during filtration was used to prepare the lithium sulfate solution of step 4, and the filtrate (5 kg) was used in a post-step process.

Step 7: A sodium carbonate solution (7.13 kg) having a concentration of 15 wt % was added to the filtrate (5 kg), which was made to react at a temperature of 80° C. to 90° C. for 1 hour to form lithium carbonate and filtered. The filtrate (11.29 kg) generated during the filtration was used as the lithium waste solution of step 1, and the solid lithium carbonate which was the residue during the filtration was added and washed and then the wash solution was used as the lithium waste solution of step 1, and finally it was possible to obtain a solid lithium carbonate (0.78 kg).

<Example ii> Preparation Process of Solid Lithium Carbonate, Step 2 pH 10

Solid lithium carbonate was prepared in the same manner as in Example i, except that in step 2 of Example i, the pH was adjusted to 10.

<Example iii> Preparation Process of Solid Lithium Carbonate, Step 2 pH 12

Solid lithium carbonate was prepared in the same manner as in Example i, except that in step 2 of Example i, the pH was adjusted to 12.

<Example iv> Preparation Process of Solid Lithium Carbonate, Step 3 70° C.

Solid lithium carbonate was prepared in the same manner as in Example i, except that in step 3 of Example i, the temperature was raised to 70° C.

<Example v> Preparation Process of Solid Lithium Carbonate, Step 3 90° C.

Solid lithium carbonate was prepared in the same manner as in Example i, except that in step 3 of Example i, the temperature was raised to 90° C.

<Comparative Example i> Preparation Process of Solid Lithium Carbonate, Step 2 pH 9

Solid lithium carbonate was prepared in the same manner as in Example i, except that in step 2 of Example i, the pH was adjusted to 9.

<Comparative Example ii> Preparation Process of Solid Lithium Carbonate, Step 2 pH 13

Solid lithium carbonate was prepared in the same manner as in Example i, except that in step 2 of Example i, the pH was adjusted to 13.

<Comparative Example iii> Preparation Process of Solid Lithium Carbonate, Step 2 pH 13.5

Solid lithium carbonate was prepared in the same manner as in Example i, except that in step 2 of Example i, the pH was adjusted to 13.5.

<Comparative Example iv> Preparation Process of Solid Lithium Carbonate, Step 3 50° C.

Solid lithium carbonate was prepared in the same manner as in Example i, except that in step 3 of Example i, the temperature was raised to 50° C.

<Comparative Example v> Preparation Process of Solid Lithium Carbonate, Step 3 100° C.

Solid lithium carbonate was prepared in the same manner as in Example i, except that in step 3 of Example i, the temperature was raised to 100° C.

<Comparative Example vi> Preparation Process of Solid Lithium Carbonate, Step 2 pH 8

Solid lithium carbonate was prepared in the same manner as in Example i, except that in step 2 of Example i, the pH was adjusted to 8.

<Comparative Example vii> Preparation Process of Solid Lithium Carbonate, Step 2 pH 7

Solid lithium carbonate was prepared in the same manner as in Example i, except that in step 2 of Example i, the pH was adjusted to 7.

<Comparative Example viii> Preparation Process of Solid Lithium Carbonate, Step 3 60° C.

Solid lithium carbonate was prepared in the same manner as in Example i, except that in step 3 of Example i, the temperature was raised to 60° C.

<Comparative Example ix> Preparation Process of Solid Lithium Carbonate, Step 3 25° C.

Solid lithium carbonate was prepared in the same manner as in Example i, except that in step 3 of Example i, the temperature was raised to 25° C.

<Experimental Example i> Measurement of Lithium Recovery Rate According to Each Condition In Examples i to v and Comparative Examples i to ix, lithium content of the primary lithium carbonate prepared as compared to lithium in the initial lithium waste solution was measured. The results are shown in Table i.

TABLE I

| Classification | Condition | Lithium recovery rate (%) |
|---|---|---|
| Example i | Standard | 76.52 |
| Example ii | Step 2 pH 10 | 70.84 |
| Example iii | Step 2 pH 12 | 76.52 |
| Example iv | Step 3 70° C. | 75.35 |
| Example v | Step 3 90° C. | 76.52 |
| Comparative Example i | Step 2 pH 9 | 53.72 |
| Comparative Example ii | Step 2 pH 13 | 75.64 |
| Comparative Example iii | Step 2 pH 13.5 | 70.84 |
| Comparative Example iv | Step 3 50° C. | 62.72 |
| Comparative Example v | Step 3 100° C. | 76.52 |
| Comparative Example vi | Step 2 pH 8 | 42.37 |
| Comparative Example vii | Step 2 pH 7 | 38.26 |
| Comparative Example viii | Step 3 60° C. | 70.84 |
| Comparative Example ix | Step 3 25° C. | 39.92 |

As shown in Table i, in Examples i to iii, in which the pH was adjusted to 10 to 12 through sodium hydroxide in step 2, the lithium content of lithium carbonate prepared were all 72 wt % or more relative to the waste solution lithium, and Example i with the pH adjusted to 11 was found to show the best lithium recovery rate. On the other hand, Comparative Example i in which the pH was adjusted to 9 showed a lower value, and Comparative Examples ii and iii in which the pH was adjusted to 13 and 13.5 were lower in recovery rate than in Example i, and sodium hydroxide was used excessively in an amount of 5 to 10 times more than that of Example i, thereby causing the process cost to increase and resulting in an adverse effect of increase in wastewater treatment costs. The reason why the recovery rates of Comparative Examples ii and iii are lowered is because, as described above, a part of lithium is formed into lithium hydroxide due to the excessive amount of sodium hydroxide added, and lithium is dissolved again due to solubility of lithium hydroxide, resulting in an increase in lithium concentration in the lithium recovered filtrate during the filtration of step 3.

Examples i, iv and v in which the temperature was raised to be adjusted to a temperature of 70° C. to 90° C., show that the lithium content of the prepared lithium carbonate were all 77 wt % or more compared to the lithium of a waste solution, and in Comparative Example v at 100° C., it shows a similar recovery rate as in Example i, but shows a poor result in terms of efficiency relative to the energy cost to be charged for the temperature rise. In Comparative Example iv, in which the temperature was raised to 50° C., it was confirmed that the lithium recovery rate was lowered and this seems to be due to the solubility of lithium phosphate being inversely proportional with temperature wherein the solubility becomes lower as the temperature is higher and becomes higher as the temperature is lower.

<Experimental Example ii> Measurements of Lithium Recovery Rate According to Cycle In Example i, the entire process was repeated from 2 to 5 times, and the relative weights and lithium recovery rates of each of the materials relative to the total weight of the lithium waste solution were measured according to the respective cycles, and the results are shown in FIG. 9.

As shown in FIG. 9, the recovery rate of lithium from the lithium of the initial lithium waste solution through the experiment was 76.5%. As shown in FIG. 9, the recovery rate increased as the number of cycles was increased and at the fifth cycle, it was confirmed that it is possible to recover 93.7% of lithium relative to the lithium of the initial lithium waste solution.

<Experimental Example iii> XRD Analysis of Product in Each Step

Figure 8:
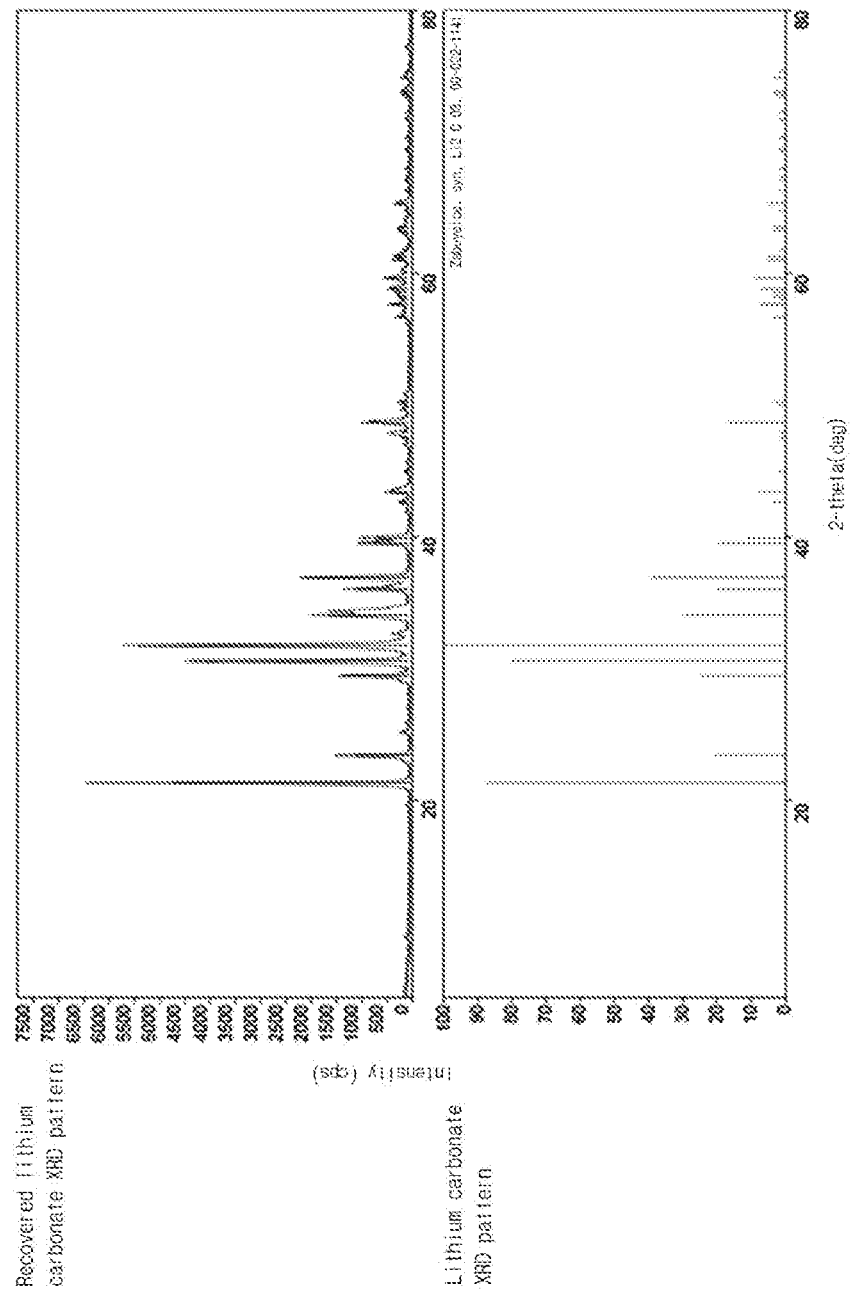
FIG. 8 is a graph showing an XRD analysis result of a recovered lithium compound (lithium carbonate).

In Example i, X-ray diffraction analysis of lithium carbonate produced in each step was carried out, and the results are shown in FIG. 8.

As shown in FIG. 8, it was confirmed that the final lithium carbonate that was prepared was easily formed.

Although a specific embodiment of the lithium phosphate preparing method has been described above, it is apparent that various modifications can be made without departing from the scope of the present invention.

Therefore, the scope of the present invention should not be construed as being limited to the embodiments described, but should be determined by equivalents to the appended claims, as well as the following claims.

That is, it is to be understood that the foregoing embodiments are illustrative and not restrictive in all aspects and that the scope of the present invention is indicated by the appended claims rather than the foregoing description, and it is intended that all changes and modifications derived from the equivalent concept be included within the scope of the present invention.

What is claimed is:

1. A method for preparing a solid lithium carbonate from a lithium solution, comprising the steps of,
    preparing a mixture in which a phosphorus-containing material is added to a lithium solution, in step 1;
    adding a basic solution to the prepared mixture to adjust the pH, in step 2;
    making the pH-adjusted mixture react by raising its temperature and filtering to recover lithium phosphate, in step 3;
    preparing an acid lithium solution in which distilled water and acid are added to the recovered lithium phosphate, in step 4;
    recovering a solid lithium salt by evaporative concentration of the acid lithium solution, in step 5;
    adjusting the pH by adding distilled water and a basic solution to the recovered solid lithium salt to obtain a pH-adjusted solution, in step 6; and
    preparing a solid lithium carbonate by adding a carbonate to the pH-adjusted solution, in step 7.

2. The method of claim 1, wherein the phosphorus-containing material in step 1 comprises phosphoric acid ($H_3PO_4$) or phosphate.

3. The method of claim 1, wherein the phosphorus-containing material addition ratio in step 1 is 0.8 to 1.2 times the lithium equivalent in the lithium solution.

4. The method of claim 1, wherein the basic solution of step 2 comprises one or more selected from the group consisting of sodium hydroxide (NaOH), potassium hydroxide (KOH), magnesium hydroxide ($Mg(OH)_2$), calcium hydroxide($Ca(OH)_2$), and barium hydroxide ($Ba(OH)_2$).

5. The method of claim 1, wherein the addition of the basic solution of step 2 is performed such that the pH of the mixture is from 10 to 12.

6. The method of claim 1, wherein the temperature raise in step 3 is performed so the temperature is raised to 70° C. to 90° C. and a reaction is carried out by maintaining the temperature for 30 minutes to 90 minutes after the temperature is raised.

7. The method of claim 1, wherein the preparation of the acid lithium solution in step 4 is performed by adding 2.5 to 4.5 times by weight of distilled water relative to the recovered lithium phosphate and 0.75 to 1.75 times by weight of acid relative to the recovered lithium phosphate.

8. The method of claim 1, wherein the acid in step 4 comprises one or more selected from the group consisting of sulfuric acid, nitric acid, hydrochloric acid, acetic acid, oxalic acid, citric acid and formic acid.

9. The method of claim 1, wherein the evaporative concentration of step 5 is performed two to five times.

10. The method of claim 9, wherein filtration is performed after the evaporative concentration of step 5, and the filtrate resulting from the filtration is used as a phosphorus-containing material of step 1.

11. The method of claim 1, further comprising the step of washing the lithium salt recovered in step 5, as step 5a.

12. The method of claim 11, wherein the washing of step 5a is performed with 10 wt % to 40 wt % of distilled water relative to the recovered lithium salt.

13. The method of claim 11, wherein a wash solution resulting from the washing of step 5a is used as an acid lithium solution of step 4.

14. The method of claim 1, wherein the amount of distilled water added in step 6 is 2 to 20 times the weight of the recovered solid lithium salt.

15. The method of claim 1, wherein the basic solution of step 6 comprises one or more selected from the group consisting of sodium hydroxide (NaOH), potassium hydroxide (KOH), magnesium hydroxide ($Mg(OH)_2$), calcium hydroxide($Ca(OH)_2$), barium hydroxide ($Ba(OH)_2$), and a carbonate.

16. The method of claim 1, wherein the pH adjustment in step 6 is adjusted to a pH of 9 to 11.

17. The method of claim 1, wherein the pH adjustment of step 6 is performed at a temperature of 60° C. to 90° C. for 30 minutes to 90 minutes.

18. The method of claim 1, wherein in step 6, filtration is performed after the pH adjustment and the filtrate from the filtration is used as an acid lithium solution of step 4.

19. The method of claim 1, wherein the carbonate of step 7 is one or more selected from the group consisting of sodium carbonate ($Na_2CO_3$), sodium bicarbonate ($NaHCO_3$), potassium carbonate ($K_2CO_3$), potassium bicarbonate ($KHCO_3$), calcium carbonate ($CaCO_3$), magnesium carbonate ($MgCO_3$) barium carbonate ($BaCO_3$) and dolomite ($CaMg(CO_3)_2$).

20. The method of claim 1, wherein in step 7, filtration is performed after the addition of the carbonate, and the filtrate from the filtration is used as a mixture of step 1.

21. The method of claim 20, wherein in step 7, washing is performed after the filtration and the wash solution resulting from the washing is used as a mixture of step 1.

22. The method of claim 18, further comprising the step of adding a sodium carbonate solution at a concentration of 5 wt % to 50 wt % to the filtered filtrate and preparing a solid lithium carbonate by filtering and washing.

23. A method for preparing a solid lithium carbonate from a waste solution of a waste lithium battery, comprising the steps of,
preparing a mixture in which phosphoric acid is added to a waste solution of a waste lithium battery containing lithium, in step i;
adding a basic solution to the prepared mixture to adjust the pH to 10 to 12, in step ii;
making the pH-adjusted mixture react by raising its temperature of 70° C. to 90° C. and recovering lithium phosphate by filtration, in step iii;
preparing a lithium sulfate solution in which distilled water and sulfuric acid are added to the recovered lithium phosphate, in step iv;
recovering a solid lithium sulfate by evaporative concentration of the lithium sulfate solution, in step v;
adjusting the pH by adding distilled water and a basic solution to the recovered solid lithium sulfite to obtain a pH-adjusted solution, in step vi; and
preparing a solid lithium carbonate by adding a carbonate to the pH-adjusted solution, in step vii.

* * * * *